United States Patent [19]
Duncan, Jr.

[11] 3,908,139
[45] Sept. 23, 1975

[54] PORTABLE POWER TOOLS

[75] Inventor: Avery A. Duncan, Jr., Pickens, S.C.

[73] Assignee: The Singer Company, New York, N.Y.

[22] Filed: June 10, 1974

[21] Appl. No.: 477,879

[52] U.S. Cl. ................... 310/50; 173/163; 310/43
[51] Int. Cl.² ................................................ H02K 7/14
[58] Field of Search ............ 310/50, 42, 43, 47, 89, 310/90, 91, 66; 240/1.3, 2 C; 354/145; 315/241 P; 264/272; 51/170 T; 173/170, 163

[56] References Cited
UNITED STATES PATENTS

| | | | |
|---|---|---|---|
| 1,922,258 | 8/1933 | Packer | 310/43 X |
| 2,646,672 | 7/1953 | Fairbank | 240/1.3 X |
| 3,225,230 | 12/1965 | Maffey, Jr. | 310/50 |
| 3,546,502 | 12/1970 | Botefuhr | 310/50 |

*Primary Examiner*—J. D. Miller
*Assistant Examiner*—Robert J. Hickey
*Attorney, Agent, or Firm*—Marshall J. Breen; Edward L. Bell; Harold Weinstein

[57] ABSTRACT

A portable power tool having a tool head extending from a power unit housing comprising first and second housing segments joined together in clam shell fashion. A detachable annular fastener receiving member is seated in fixed position in the cojoined housing segments for reception of screws extending through the tool head. Progressive engagement of the screws with the fastener receiving member draws the tool head against the housing segments such that the tool head is clamped to the housing segments. Alignment surfaces formed on the tool head are engageable with corresponding alignment surfaces formed on the housing segments to align the tool head with respect to the housing segments and the fastener receiving member.

8 Claims, 4 Drawing Figures

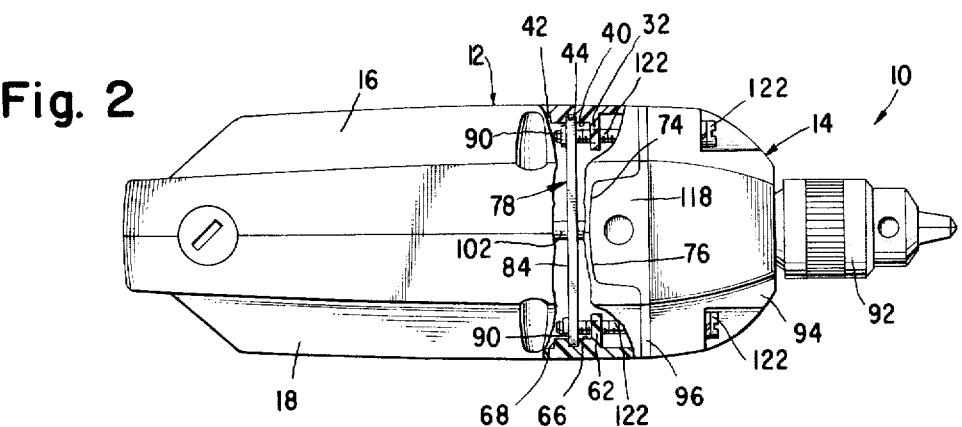
Fig. 2
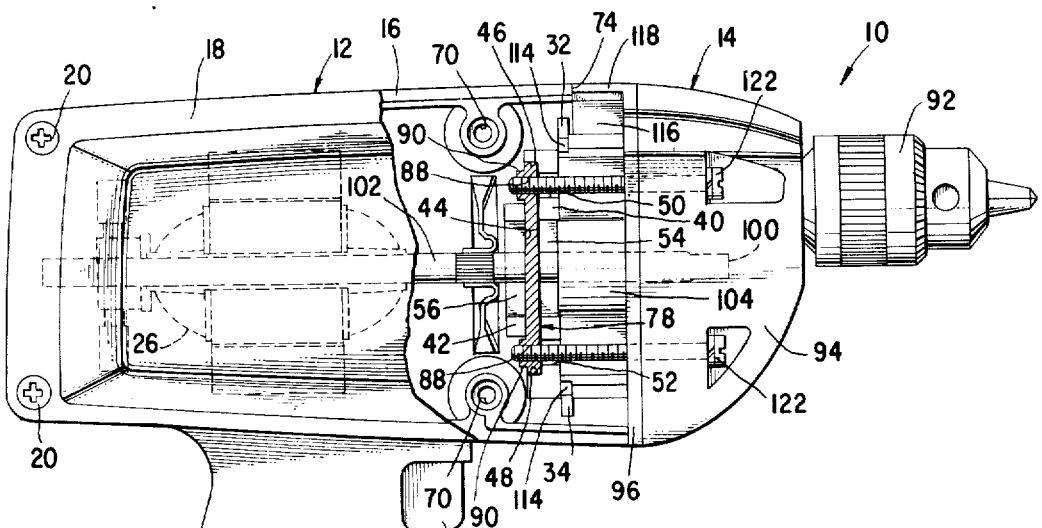
Fig. 3
Fig. 4

PORTABLE POWER TOOLS

BACKGROUND OF THE INVENTION

This invention relates to portable power tools, and more particularly to a power tool construction wherein a separate fastener receiving member entrapped in the power unit housing is used to clamp a tool head to the power unit housing.

In many portable power tools currently being manufactured a tool head unit is threadably fastened to a power unit housing or each unit is fastened to an internal supporting framework or skeleton. If the power unit is a motor, the power unit housing is generally made of plastic or other insulating material, and a tool head fastener usually extends from the tool head directly into the housing walls or into the interior skeleton. Since plastic threads are normally weaker than corresponding metal threads it is common practice to install in the plastic housing inserts having metallic threads which installation can be a tedious and expensive procedure. Moreover the inserts occasionally become loose or fall out of the housing requiring a repair or replacement of the housing. Interior support skeletons generally require high manufacturing tolerances and are thus expensive to fabricate.

It is thus desirable to provide a sturdy, inexpensive portable power tool construction that does not require housing inserts or an interior support skeleton.

Among the several objects of the present invention may be noted the provision of a novel portable power tool wherein a separate fastener receiving member in the power unit housing is used to clamp the tool head to the power unit housing; a novel portable power tool wherein a tool head is clamped to a power unit housing by fasteners that do not enter the wall of the housing; a novel portable power tool having a detachable fastener receiving member positioned in the power unit housing for reception of fasteners disposed in the tool head; a novel portable power tool having a detachable fastener receiving member that remains entrapped in fixed position in the power unit housing without being fastened thereto; and a novel portable power tool having novel means for aligning the tool head with the power unit housing. Other objects and features will be in part apparent and in part pointed out hereinafter.

SUMMARY OF THE INVENTION

The present invention relates to a novel portable power tool wherein a fastener receiving member entrapped in the power unit housing is used to clamp a tool head to the power unit housing. The portable power tool, in the preferred embodiment, includes a pair of housing segments secured together in clam shell fashion with the tool head projecting from the co-joined housing segments. The fastener receiving member which is generally annular in shape, is detachably entrapped in fixed position in the power unit housing in an elongated groove formed on the interior surface of each housing segment. A plurality of tapped holes are provided in the fastener receiving member for reception of a corresponding plurality of screws extending through the tool head. Progressive engagement between the screws and the fastener receiving member serves to draw a rear wall of the tool head against the first and second housing segments thereby clamping the tool head against the housing. A plurality of alignment protrusions formed on the interior surface of each housing segment for engagement with corresponding alignment flanges formed upon the rear wall of the tool head align the tool head with the housing segments and align the screws in the tool head with the tapped holes in the fastener receiving member.

The invention accordingly comprises the constructions hereinafter described, the scope of the invention being indicated in the following claims.

DESCRIPTION OF THE DRAWINGS

In the accompanying drawings:

FIG. 2 is a top view of the portable power tool in assembled condition;

FIG. 3 is a side view thereof partly shown in section; and

FIG. 4 is a fragmentary plan view of one of the motor housing segments.

Corresponding reference characters indicate corresponding parts throughout the several views of the drawing.

DESCRIPTION OF THE INVENTION

Figure 1:
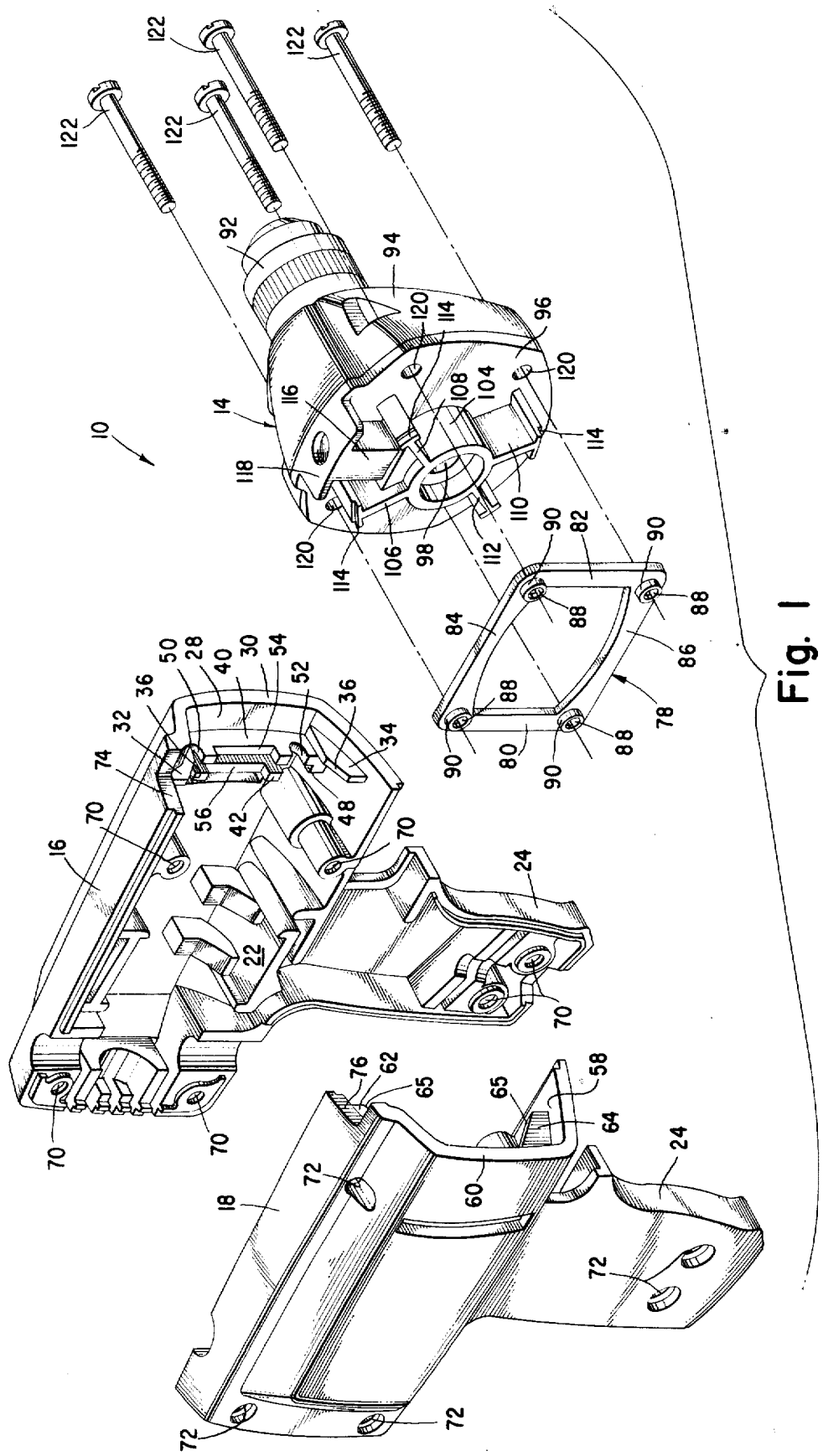
FIG. 1 is an exploded perspective view of the portable power tool members incorporating the present invention.

Referring to FIGS. 1, 2 and 3 of the drawings for a detailed description of the present invention, a portable power tool is generally indicated by reference number 10. The tool 10 comprises a motor housing 12 with a tool head 14 extending therefrom.

The motor housing 12 comprises first and second housing segments 16 and 18 secured together in clam shell fashion by screws 20 for example, engageable with nuts (not shown) on the other side of segment 16. The segment 16, which is made of plastic or any other suitable material, is formed with a motor mount section generally indicated by reference number 22 and an integral depending handle portion 24. Motor mount section 22 accommodates a motor 26 shown dotted in FIG. 3.

The segment 16 includes an interior surface 28 terminating in a front edge surface 30. Spaced upper and lower alignment projections 32 and 34 are formed on the interior surface 28, which projections each include a respective alignment surface 36. A main clamping flange 40 and a backup flange 42 are also formed on the interior surface 28 of the segment 16 defining a groove 44 therebetween. The main clamping flange 40 is formed with opposite end corners 46 and 48. Narrow U-shaped recesses 50 and 52 are respectively provided adjacent the end corners 46 and 48. An elongated recess 54 is formed in the main flange 40 between the U-shaped recesses 50 and 52, and a corresponding aligned elongated recess 56 is formed in the backup flange 42.

The segment 18 is symmetrically similar to the segment 16 and includes an interior surface 58 terminating in a front edge surface 60. The segment 18 also includes upper and lower alignment projections 62 and 64 each having an alignment surface 65, and main and backup flanges 66 and 68 (FIG. 2) all of which are symmetrically identical to the corresponding structure in the segment 16. Unthreaded fastener holes such as 70 in the segment 16 and 72 in the segment 18 are formed to accommodate the screws 20 for co-joining the segments 16 and 18 together. Right angle recesses 74 and 76 are respectively formed in the front edge surfaces 30 and 60 of the housing segments 16 and 18.

The tool 10 further includes a generally rectangular annular fastener receiving member 78 formed of steel or other suitable material. The fastener receiving member 78, which is also known in the art as a stripnut, includes opposite short sides 80, 82 and opposite long sides 84, 86 provided with threaded holes 88 extending through bosses 90 formed at the corners of the sides 80, 82, 84 and 86.

The tool head 14 includes a standard chuck member 92 conventionally mounted to a gear housing 94 having the usual speed reducing gear train (not shown). The gear housing 94 has a detachable rear wall 96 formed with an opening 98 for admitting a pinion end 100 of a motor shaft 102 into the gear housing 94. A bearing journal 104 is formed on the wall 96 around the opening 98 to support a motor shaft bearing (not shown). The rear wall 96 further includes four T-shaped flanges 106, 108, 110 and 112 formed thereon and extending radially from the bearing journal 104. An end alignment surface portion 114 of each of the flanges 106, 108, 110 and 112 is machined to a first predetermined radial dimension measured from the axis of the opening 98. The alignment surfaces 36, 36, 65 and 65 of the projections 32, 34, 62 and 64 on the segments 16 and 18 are molded or machined to a second predetermined radial dimension slightly exceeding the first predetermined radial dimension.

The rear wall 96 of the tool head 14 also includes an enlarged T-shaped flange 116 formed thereon. The enlarged T-shaped flange 116 comprises a generally rectangular head portion 118 of complementary size and shape with respect to the right angle recesses 74 and 76 in the segments 16 and 18. Four fastener openings 120 are provided in the gear housing 94 and extend through the rear wall 96 in alignment with the threaded holes 88 in the fastener receiving member 78.

In the preferred sequence of assembling the portable power tool 10, the motor 26, a switch 124 and other conventionally associated electrical components are positioned in the segment 16 in any suitable known manner. The fastener receiving member 78 is placed between the main flange 40 and the backup flange 42 such that one of the short sides 80, 82 is seated in the groove 44. The spacing between the end corner portions 46 and 48 of the main flange 40 permits a slip fit of the fastener receiving member 78 in the groove 44. With the fastener receiving member 78 thus seated in the groove 44 two of the threaded holes 88 align with the U-shaped recesses 50 and 52. The fastener receiving member 78 can be positioned such that the bosses 90 face either the motor mount section 22 of the segment 16 or the alignment projections 32 and 34 thereof. The segment 16 is then co-joined with the segment 18 such that the opposite short side 80 or 82 of fastener receiving member 78 is seated between the main and backup flanges 66 and 68 of the segment 18. The fastener receiving member 78 thus substantially extends from the interior surface 28 of the segment 16 to the interior surface 58 of the segment 18. The segments 16 and 18 are then joined together by inserting the screws 20 in the fastener holes 70 and 72 and attaching nuts (not shown) to the end of the screws 20.

The tool head 14 is aligned with the segments 16 and 18 by permitting the generally rectangular portion 118 of the enlarged T-shaped flange 116 to occupy the right angle recesses 74 and 76 of the segments 16 and 18. The milled alignment surfaces 114 on the rear wall 96 can then properly engage the alignment surfaces 36, 36, 65 and 65 on the segments 16 and 18. This engagement aligns the fastener holes 120 in the gear housing 94 with the threaded holes 88 in the fastener receiving member 78 and permits the pinion end 100 of the motor shaft 102 to enter the opening 98 in the rear wall 96. As the fasteners 122 progressively engage the threaded holes 88 in the fastener receiving member 78 the rear wall 96 of the gear housing 94 is drawn against edge surface 30 and 60 of the segments 16 and 18. The rear wall 96 thus defines a contact surface for bearing against the segments 16 and 18. The force between the rear wall 96 and the front edge surfaces 30 and 60 induced by the fasteners 122 engaging the fastener receiving member 78 is opposed by the force of member 78 against main flanges 40 and 66 of the segments 16 and 18. The tool head 14 is thus clamped to the motor housing 12 by the fasteners 122 although said fasteners bypass physical engagement with the housing segments 16 and 18.

As will be apparent to those skilled in the art, the portable power tool 10 can be assembled in other sequences. For example the fastener receiving member 78 can be loosely engaged with the fasteners 122 in the tool head 14 and thereafter the fastener receiving member 78, with the fasteners 122 loosely threaded therein can be seated in the segment 16. The two tool head fasteners 122 associated with the segment 16 can then be progressively engaged in the seated fastener receiving member 78 to draw the rear wall 96 of the tool head 14 into slight contact against the front edge surface 30 of the segment 16. Thereafter the segment 18 can be joined to the segment 16 and all four screws 122 in the tool head 14 tightened as desired. Since the fastener receiving member 78 is detachably entrapped but not fastened to the segments 16 and 18, either segment can be entirely disassembled from the tool 10 without unfastening the screws 122 from the fastener receiving member 78. It will also be apparent that the portable power tool 10 can be powered from a source of energy other than an electrically motorized power unit such as a pneumatic power unit.

Some advantages of the novel portable tool power tool 10 evident from the foregoing description include a tool head 14 that can be clamped to a power unit housing 12 by fasteners 122 that engage a fastener receiving member 78 but do not physically engage the power unit housing. Consequently the power unit housing can be disassembled from the tool head 14 without unfastening the screws 122 in the tool head that engage the fastener receiving member 78. Other advantages are a tool head 14 that can be securely clamped to a power unit housing 12 without providing an interior skeleton or tapping threads or providing inserts in the power unit housing. Therefore the presently disclosed arrangement can be made with less exacting tolerances than are normally required in structures having inserts, tapped holes, or interior skeletons.

In view of the above, it will be seen that the several objects of the invention are achieved and other advantageous results obtained.

As various changes can be made in the above constructions without departing from the scope of the invention, it is intended that all matter contained in the above description or shown in the accompanying drawings shall be interpreted as illustrative and not in a limiting sense.

Having thus set forth the nature of nature of the invention, what is claimed herein is:

1. In combination in a portable power tool:
   a. a power unit housing comprising first and second housing segments;
   b. means for securing said housing segments together;
   c. each of said housing segments including an interior surface;
   d. tool head means extending from said housing segments;
   e. said tool head means being detachable from said housing segments and including a contact surface for bearing against said housing segments;
   f. clamping means for detachably clamping said tool head means to said housing segments;
   g. said clamping means comprising a detachable fastener receiving member removably disposed in said housing segments;
   h. said retaining means formed in each of said housing segments including an elongated slot formed on the interior surface thereof for holding said fastener receiving member in a predetermined fixed position in said housing segments;
   i. said clamping means further including fastening means for engaging said fastener receiving member, and
   j. said fastening means being located in and extending through said tool head means to progressively engage said fastener receiving member and draw said tool head means toward said first and second housing segments to permit said contact surface to bearingly engage said housing segments whereby said fastening means clamp said tool head means to said first and second housing segments by engagement with said fastener receiving member.

2. The combination of claim 1 wherein said fastener receiving member has opposite side portions and said means for securing said housing segments together positions the elongated slots in each said housing segment such that the opposite side portions of said fastener receiving member are seated in said elongated slots to fix the position of said fastener receiving member in said co-joined housing segments.

3. The combination of claim 1 wherein said fastener receiving member comprises a rigid annular member having a plurality of threaded holes formed therein for engagement by said fastening means.

4. The combination of claim 1 wherein said securing means include first detachable screw members arranged in said housing segments such that detachment of said first screw members from said housing segments permits separation of said segments from each other and from said tool head means and said fastener receiving member without unfastening said fastening means from said fastener receiving member.

5. The combination of claim 1 wherein said fastening means include second detachable screw members arranged in said tool head means such that said second screw members bypass physical engagement with said housing segments.

6. The combination of claim 1 wherein said housing segments each include an interior surface, said housing segments further including alignment means formed on the interior surfaces thereof for engagement with said tool head means to align said tool head means in a predetermined position with respect to said housing segments, when said tool head means is clamped to said housing segments.

7. The combination of claim 1 wherein said tool head means include alignment means formed thereon for engagement with said housing segments to align said tool head means in a predetermined position with respect to said housing segments when said tool head means is clamped to said housing segments.

8. The combination of claim 7 wherein said alignment means include at least two elongated flange portions projecting from said contact surface, each of said flange portions having a free end surface with at least one of said end surfaces engaging one of said housing segments and another of said end surfaces engaging the other said housing segment.

* * * * *